United States Patent [19]
Nunnally

[11] Patent Number: 5,936,233
[45] Date of Patent: Aug. 10, 1999

[54] BURIED OBJECT DETECTION AND NEUTRALIZATION SYSTEM

[75] Inventor: William C. Nunnally, Columbia, Mo.

[73] Assignee: The Curators of the University of Missouri, Columbia, Mo.

[21] Appl. No.: 09/031,339

[22] Filed: Feb. 26, 1998

[51] Int. Cl.[6] .................................................. G01V 9/04
[52] U.S. Cl. .......................... 250/221; 250/222.1; 342/76
[58] Field of Search ........................... 250/221, 222.1, 250/559.38, 559.4; 340/619, 850; 342/22, 76, 90, 58; 359/155, 169

[56] References Cited

U.S. PATENT DOCUMENTS

| | | | |
|---|---|---|---|
| H1132 | 1/1993 | Hellyar et al. ............................ | 367/128 |
| 3,815,505 | 6/1974 | Roh et al. . | |
| 4,277,167 | 7/1981 | Eppel .......................................... | 356/5 |
| 4,430,653 | 2/1984 | Coon et al. . | |
| 4,675,677 | 6/1987 | von Maydell et al. .................... | 342/25 |
| 4,698,634 | 10/1987 | Alongi et al. .............................. | 342/22 |
| 4,967,199 | 10/1990 | Gunton et al. ............................. | 342/22 |
| 4,996,455 | 2/1991 | Löffler et al. . | |
| 5,034,810 | 7/1991 | Keeler ....................................... | 358/95 |
| 5,057,846 | 10/1991 | Harmuth ................................... | 342/204 |
| 5,140,463 | 8/1992 | Yoo et al. .................................. | 359/559 |
| 5,231,401 | 7/1993 | Kaman et al. ............................. | 342/55 |
| 5,248,975 | 9/1993 | Schutz ....................................... | 342/21 |
| 5,258,618 | 11/1993 | Noble ....................................... | 250/332 |
| 5,339,080 | 8/1994 | Steinway et al. .......................... | 342/22 |
| 5,357,063 | 10/1994 | House et al. .............................. | 181/108 |
| 5,357,253 | 10/1994 | Van Etten et al. ......................... | 342/22 |
| 5,418,367 | 5/1995 | Imaeda ................................. | 250/339.12 |
| 5,469,176 | 11/1995 | Sandler et al. ............................ | 342/375 |
| 5,506,616 | 4/1996 | Scheps ....................................... | 348/31 |
| 5,588,032 | 12/1996 | Johnson et al. ............................ | 378/8 |
| 5,592,170 | 1/1997 | Price et al. ................................ | 342/22 |
| 5,600,303 | 2/1997 | Husseiny et al. ......................... | 340/568 |
| 5,615,174 | 3/1997 | Arnaud et al. ........................... | 367/118 |

*Primary Examiner*—Que T. Le
*Attorney, Agent, or Firm*—Jenkens & Gilchrist PC

[57] ABSTRACT

A first projectile is fired from an airborne platform aimed at a sensor point on the surface of the earth. At first projectile impact, acoustic energy is released instigating a shock wave which propagates along the earth's surface around the sensor point. Optical sensors on the airborne platform detect surface movement due to the propagating shock wave, and process the detected movement to locate and perhaps identify buried objects. Also at impact with the surface of the earth, the first projectile injects wide-band electromagnetic radiation into the earth in the form of waves propagating through the earth surface around the sensor point. Electromagnetic sensors on the airborne platform detect reflections of the propagating electromagnetic radiation, and process the received reflections to locate and perhaps identify buried objects. Once a buried object has been located, the airborne platform fires a second, explosive, projectile at the determined location to neutralize the found buried object.

25 Claims, 4 Drawing Sheets

5,936,233

BURIED OBJECT DETECTION AND NEUTRALIZATION SYSTEM

BACKGROUND OF THE INVENTION

1. Technical Field of the Invention

The present invention relates to the remote detection and neutralization of objects, such as mines, buried in an area of land. The present invention further relates to electromagnetic warfare devices. The present invention still further relates to geologic surveying and, in particular, to the prospecting for oil and minerals.

2. Description of Related Art

There has been a recent proliferation in the use of mines as weapons in armed conflicts. One reason for this is that a large and sufficient destructive effect can be achieved through the use of mines with the corresponding expenditure of relatively little monetary cost in comparison to the use of more sophisticated weapons such as missiles, artillery, and the like. Another reason is that mines are easily obtainable on both the open and black markets. Still further, mines are favored weapons because little skill or training is needed for their effective deployment. Yet another reason for an increased reliance on the use of mines is that the weapon requires no active personnel supervision following deployment. Still further the use of mines as weapons is favored because of the difficulties associated with the mine detection and eradication process. Accordingly, the land mine has become a weapon of choice for resistance and guerilla fighting forces which do not have access to large bank accounts or the support of highly trained personnel.

The threat to person or property presented by a deployed but un-detonated land mine is, in most cases, perpetual. Active and deadly land mines often far outlive the time period of the conflict in which the mine was originally intended for use. It is not unheard of for mines originally deployed in long past conflicts to continue inflicting damage on unsuspecting civilians over the course of several subsequent decades. Not only is there a great human cost in injuries and deaths attributable to such mine detonation accidents, but there is also a large associated economic cost. Medical treatment for those injured in mine detonation accidents can be quite expensive. Furthermore, those persons injured or disabled by a mine detonation may require lifelong economic support from family or government as they may be unable to economically support themselves. Moreover the fear of undetected and un-detonated land mines prevents citizens from exploiting otherwise perfectly usable land for economic benefit. It is therefore of great importance that previously deployed mines be safely, efficiently and economically detected, located and neutralized.

SUMMARY OF THE INVENTION

A first projectile is fired from an airborne platform and impacts with the surface of the earth. Acoustic energy in the form of a propagating shock wave is released by the impact. Movement of the earth's surface due to the propagating shock wave is then optically detected. Signals indicative of the detected surface movement are then processed to locate and perhaps identify buried objects. In one implementation, detected Doppler shifts in laser frequency due to ground movement are processed to locate the buried objects. In another implementation, a series of surface optical images are taken and then processed using holographic or two-wavelength infra-red image comparison to identify ground movement and locate buried objects. The impact of the first projectile with the earth's surface further generates or causes the release of wide-band electromagnetic radiation which propagates through the earth. Reflections of the propagating electromagnetic radiation from buried objects are then electromagnetically detected. Signals indicative of the detected reflections are then processed to locate and perhaps identify buried objects. In one implementation, ground penetrating RADAR-type processing is implemented to locate buried objects. Following the locating of the buried object, a second, explosive, projectile is fired at the determined location to neutralize the found buried object, or a paint projectile is used to mark the location for later handling.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
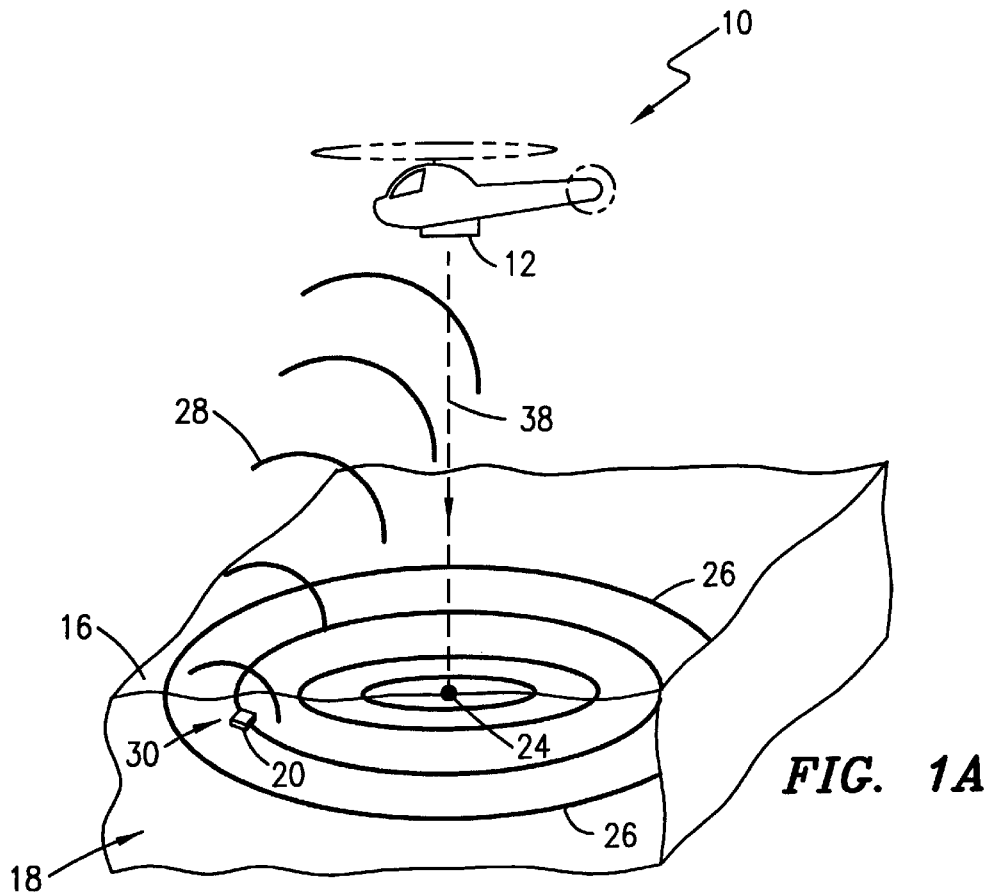
FIGS. 1A–1C illustrate the operation of a detection and neutralization system of the present invention in connection with a variety of system supporting airborne platforms.
Figure 1B:
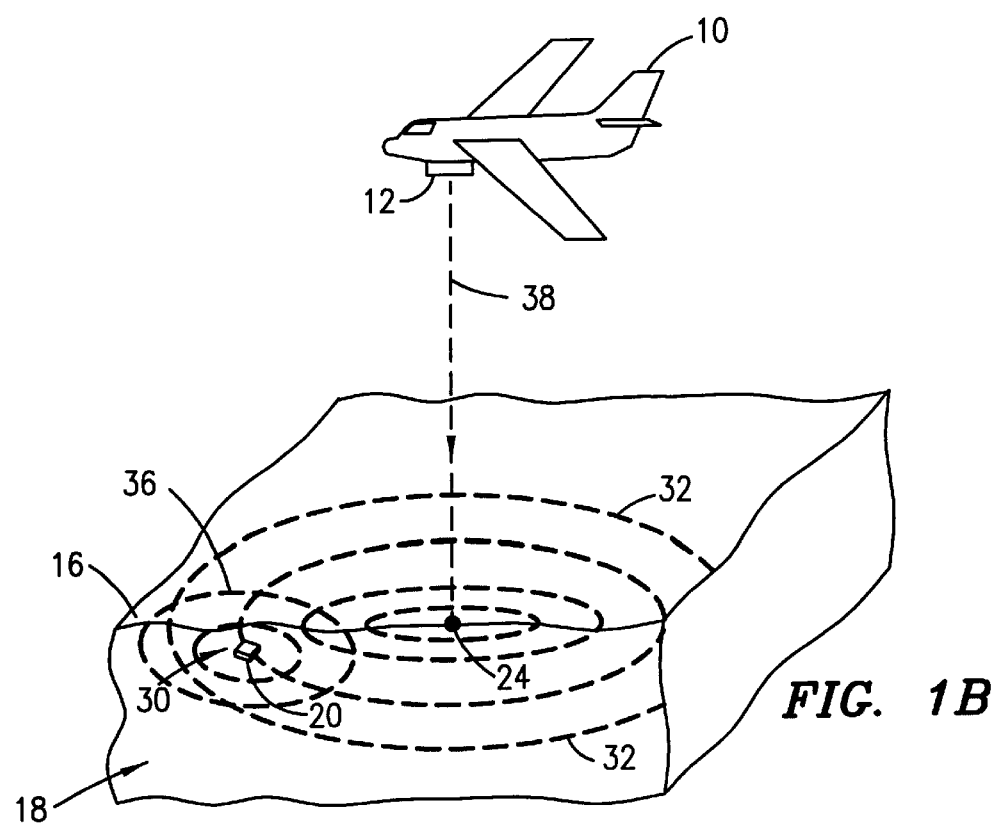
Figure 1C:
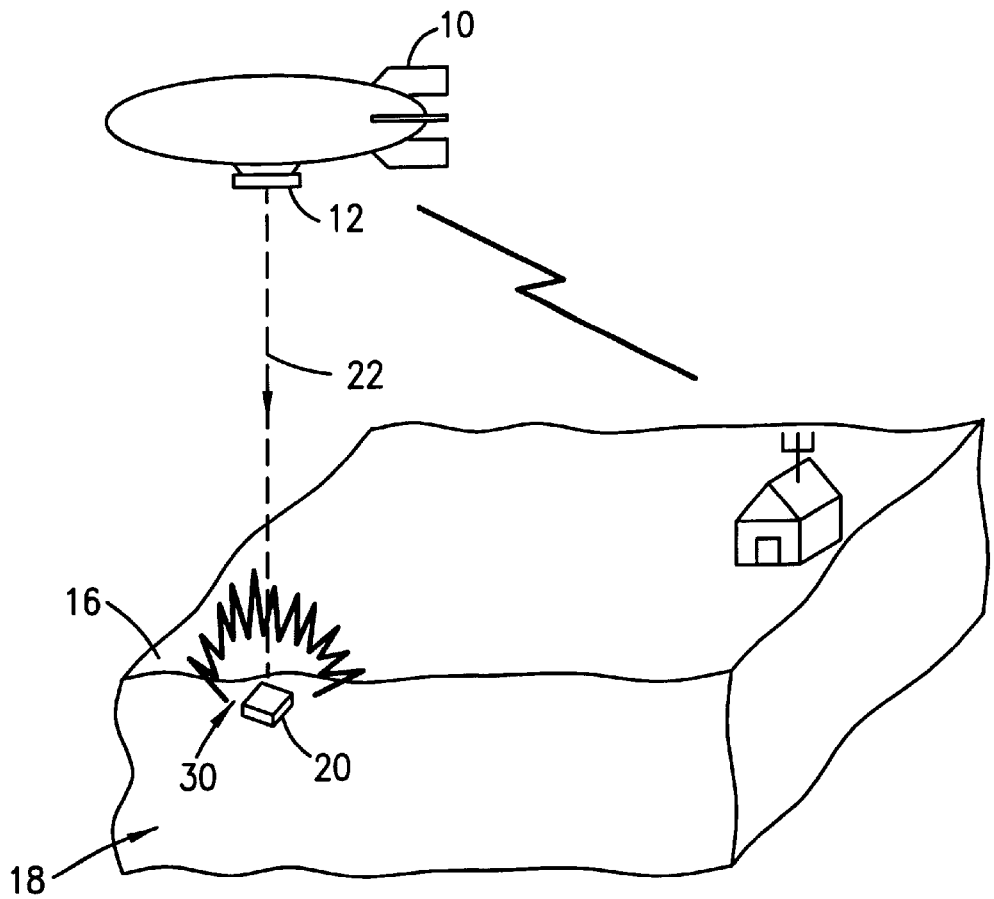

Reference is now made to FIGS. 1A–1C which illustrate the operation of a detection and neutralization system 12 of the present invention in connection with a variety of system supporting airborne platforms 10. The airborne platforms 10 suitable for supporting the detection and neutralization system 12 include: a helicopter (FIG. 1A); an airplane (FIG. 1B), and a blimp (FIG. 1C). The airborne platforms 10 may comprise either manned or unmanned vehicles. In the case of an unmanned vehicle, the movement and operation of the airborne platform 10 may be either intelligently (i.e., robotically) self-controlled or remotely controlled (as shown in FIG. 1C). In any event, capability must be provided by the airborne platform 10 for accurately controlling movement (vertically and horizontally) to enable proper operation of the detection and neutralization system 12. It would also be advantageous if the airborne platform 10 were capable of sustained hovering in addition to supporting vertical or horizontal movement.

The detection and neutralization system 12 operates in two general modes of operation. In a first mode of operation, the system 12 functions to remotely sense under the surface 16 of the earth 18 to detect the location of buried objects 20 (see, FIGS. 1A and 1B). Examples of the buried objects 20 capable of detection include: pipelines, electrical utilities, land mines, unexploded ordinance, mineral and carbon-based fuel deposits, archeological remains, voids, cavities and tunnels. In the event the buried object 20 detected must be neutralized, the system 12 functions in a second mode of operation to fire an explosive projectile charge 22 (or paint marker) at the buried object (see, FIG. 1C). Examples of situations in which object 20 neutralization may be desired include the eradication of land mines and unexploded ordinance. In some instances, such as with the locating of cavities or archeological remains, neutralization is not necessarily an option and, thus, it is understood that situations may arise where the system 12 includes capability for use, or is actually utilized, only in its first mode of operation.

The remote sensing operation performed by the system 12 utilizes both electromagnetic and acoustic detection methods. With respect to the electromagnetic detection method as generally illustrated in FIG. 1A, a sufficient amount of electromagnetic radiation is injected into the earth 18 at a given sensor point 24 on the earth's surface 16. This electromagnetic radiation propagates (as illustrated schematically by the solid line waves 26) through earth 18 in an outwardly radial direction approximately centered about the sensor point 24. Buried objects 20 in the earth 18 reflect the propagating electromagnetic radiation (as illustrated schematically by the solid line waves 28) in an outwardly radial direction approximately centered about each reflecting object. This object 20 reflected electromagnetic radiation is then received by the system 12 and processed to detect the location 30 on the earth's surface under which the electromagnetically detected object is buried. Once location 30 is determined, and if desired by the particular application, the buried object 20 may then be neutralized by the system 12, in accordance with the second mode of operation, by firing the explosive projectile charge 22 (or paint marker) aimed at the determined location 30 (see, FIG. 1C).

With respect to the acoustic detection method as generally illustrated in FIG. 1B, a sufficient amount of acoustic energy is injected into the earth 18 at a given sensor point 24 on the earth's surface 16. This acoustic energy propagates (as illustrated schematically by the broken line shock waves 32) through earth 18 in an outwardly radial direction approximately centered about the sensor point 24. Buried objects 20 in the earth 18 disturb the outwardly radial propagation of the shock waves 32 along the earth's surface 16 by reflecting the propagating acoustic energy (as illustrated schematically by the broken line shock waves 36) in an outwardly radial direction approximately centered about each reflecting object. The system 12 optically images the surface 16 of the earth as the shock waves 32 propagate along the surface, detects surface movement and processes a series of the taken surface optical images to determine the location 30 on the earth's surface under which the acoustically detected object is buried. Once location 30 is determined, and if desired by the particular application, the buried object 20 may then be neutralized by the system 12, in accordance with the second mode of operation, by firing the explosive projectile charge 22 (or paint marker) aimed at the determined location 30 (see, FIG. 1C).

The electromagnetic radiation and acoustic energy are injected into the earth 18 at the given sensor point 24 on the earth's surface 16 by having the system 10 fire a projectile 38 into the earth at the given sensor point 24. Once fired, the projectile 38 acquires a significant amount of kinetic energy. When the projectile 38 impacts with the earth's surface 16 at the given sensor point 24, a large portion of that kinetic energy is transferred to the earth 18 producing the acoustic energy which propagates in the manner illustrated schematically by the broken line shock waves 32. Furthermore, when the projectile 38 impacts with the earth's surface 16 at the given sensor point 24, a small portion of that kinetic energy is converted to electromagnetic radiation which propagates in the manner illustrated schematically by the solid line waves 26.

Figure 2:
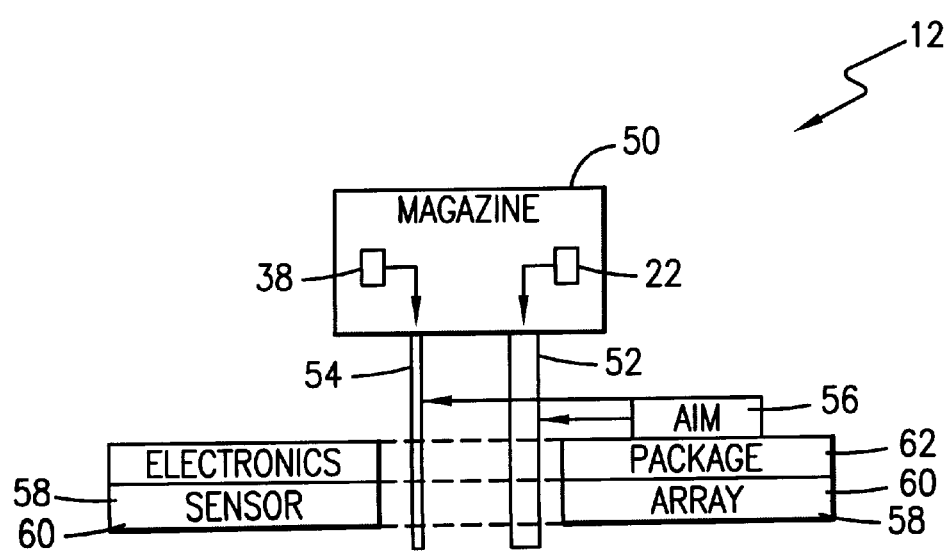
FIG. 2 is a schematic diagram of the detection and neutralization system of the present invention.

Reference is now made to FIG. 2 wherein there is shown a schematic diagram of the detection and neutralization system 12 of the present invention. The system 12 includes a munitions magazine 50 for storing both the explosive projectile charges 22 (or paint markers) which are fired to neutralize located objects and the projectiles 38 which are fired to inject electromagnetic radiation and acoustic energy into the earth. The munitions magazine 50 further operates to load an included destruction cannon 52 with the explosive projectile charges 22 (or paint markers), and also load a detection rifle 54 with the projectiles 38. An aiming mechanism 56 may also be included in the system 12 for aiming the destruction cannon 52 to fire loaded explosive projectile charges 22 at the determined locations of detected objects. The aiming mechanism 56 may also be used for aiming the detection rifle 54 to fire loaded projectiles 38 at the given sensor point on the earth's surface. The system 12 further includes an electromagnetic sensor array 58 for detecting the electromagnetic radiation (illustrated schematically by the solid line waves 28) reflected by buried objects. A specific implementation of the electromagnetic sensor array 58 utilizes post scanned array, ground penetrating RADAR-type signal processing to locate (and perhaps even discriminate) the buried objects. The system 12 still further includes an optical (perhaps holographic) sensor array 60 for measuring ground movement and taking a series of optical images of the shock wave propagating across the earth's surface. A specific implementation of the optical sensor array 60 utilizes laser Doppler detectors and well as imaging cameras with appropriate Doppler shift in laser frequency processing and holographic or two-wavelength infra-red image comparison processing to locate buried objects. With respect to optical sensor detection, known correlations between movement of the surface of the earth in response to the propagating shock wave and the presence of buried objects are used to detect object location.

An electronics (processing) package 62 is included with the system 12 to exercise some control over the flight direction of the associated supporting airborne platform 10 (with respect to vertical movement, horizontal movement, and hovering). Such control may have to be exercised independent of, or in combination with, the operation of the aiming mechanism 56 in insuring accurate aiming of the destruction cannon 52 (at the determined locations of detected objects) and detection rifle 54 (at the given sensor point on the earth's surface). It should further be understood that this electronics package 62 control over flight direction may be used to supplement or replace the flight control exercised by any manned operation, robotic controlled operation, or remote controlled operation of the airborne platform 10. The electronics package 62 further functions to control the loading, aiming and firing of the destruction cannon 52 and detection rifle 54.

Input received from the electromagnetic sensor array 58 and the optical sensor array 60 is further processed by the electronics package 62 to detect the location of buried objects. With respect to the electromagnetic sensor array 58 input, post scanned array, ground penetrating RADAR-type reflected signal processing is implemented by the electronics package 62 to locate, discriminate and identify buried objects. For the optical sensor array 60 input, the electronics package implements Doppler shift in laser frequency signal processing as well as holographic or two-wavelength infra-red image comparison processing to locate, discriminate and identify buried objects. With respect to the functionality for identifying the located buried object, the electronics package 62 maintains a stored library of electromagnetic and acoustic signatures for various types of buried objects (such as, pipelines, electrical utilities, land mines, unexploded ordinance, mineral and carbon-based fuel deposits, archeological remains, voids, cavities and tunnels). Responsive to the detection of a buried object, its particular type is identified by the electronics package 65 from the associated electromagnetic and/or acoustic signature. A decision may then be made as to whether that particular type of buried object must be neutralized.

The electronics package 62 still further includes a communications functionality for communicating, by radio frequency or other similar communications technique, with a remote location concerning information such as flight instructions, operation and maintenance information, and detection and destruction reports.

Figures 3, 4:
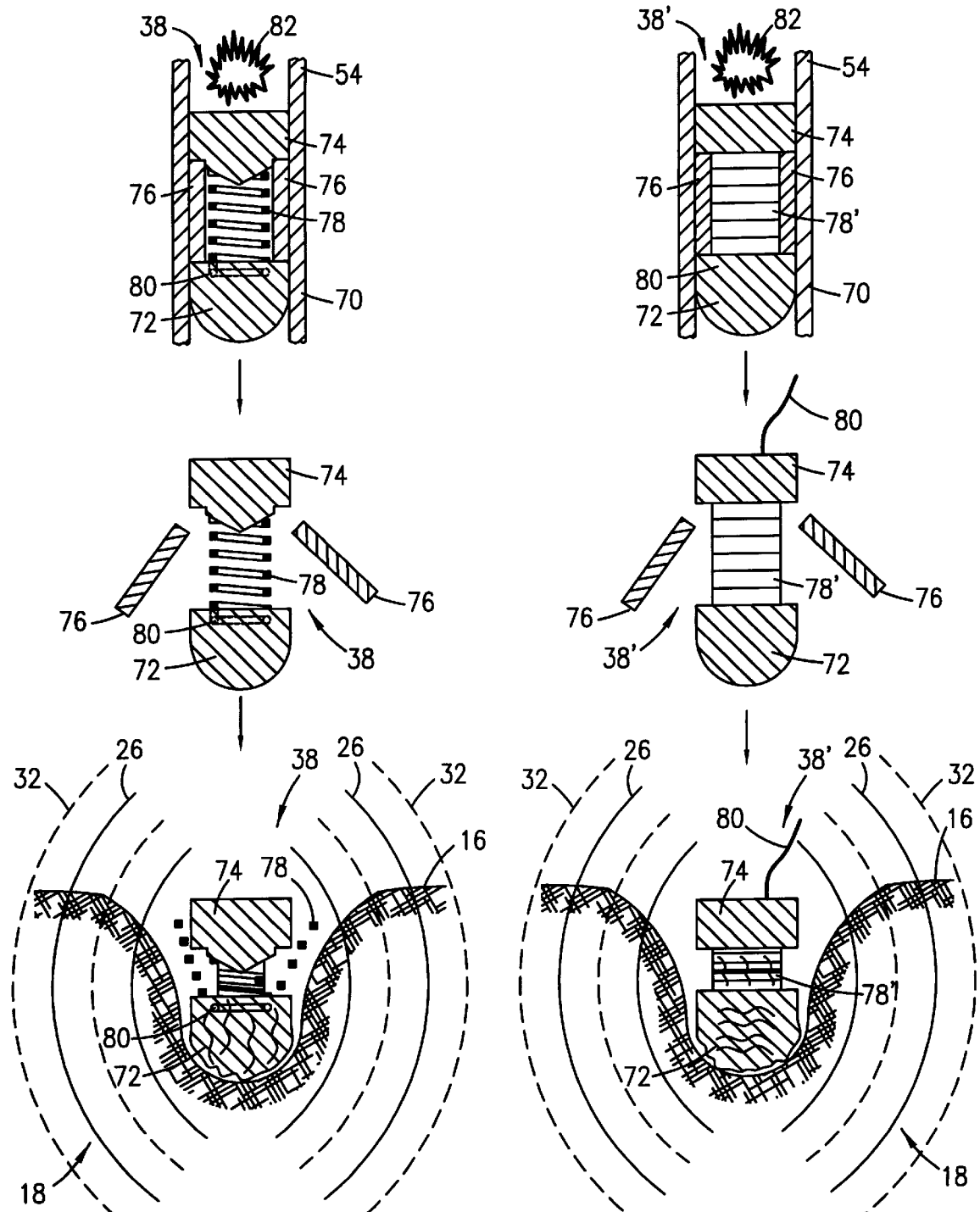
FIG. 3 is a diagram illustrating the operation of a kinetic flux compression type projectile used in one embodiment of the present invention for injecting both acoustic energy and electromagnetic radiation into the earth.
FIG. 4 is a diagram illustrating the operation of a kinetic piezo-electric compression type projectile used in another embodiment of the present invention for injecting both acoustic energy and electromagnetic radiation into the earth.

Reference is now made to FIG. 3 wherein there is shown the operation of a kinetic flux compression type projectile 38 used in one embodiment of the present invention for injecting both acoustic energy and electromagnetic radiation into the earth. At the top of FIG. 3, the kinetic flux compression type projectile 38 is shown loaded into a barrel 70 of the detection rifle 54. The kinetic flux compression type projectile 38 includes, at one end thereof, an anvil mass 72, and, at an opposite end thereof, a compression mass 74. The anvil mass 72 and compression mass 74 are separated from each other by a casing 76. The casing 76 is hollow to define an opening within which a storage coil conductor 78 is located. Electrically connected to the storage coil conductor 78 and positioned within the anvil mass 72 is a loop antenna 80.

Prior to firing of the kinetic flux compression type projectile 38, an initial current (comprising a seed flux) in applied to the storage coil conductor 78. To fire the kinetic flux compression type projectile 38, an appropriate explosion 82 is instigated behind the compression mass 74 and within the barrel 70 of the detection rifle 54. The explosion 82 causes the kinetic flux compression type projectile 38 to travel along, and be expelled from, the barrel 70. The casing 76, in combination with the restriction applied by the barrel 70, prevents the compression mass 74 from compressing the storage coil conductor 78 against the anvil mass 72 at the point of firing.

Turning now to the middle of FIG. 3, the kinetic flux compression type projectile 38 is shown in mid flight. At this point, the kinetic flux compression type projectile 38 has acquired a substantial amount of kinetic energy from the explosion 82. During flight, the casing 76, no longer under restriction applied by the barrel 70, may fall away from the kinetic flux compression type projectile 38.

At the bottom of FIG. 3, the kinetic flux compression type projectile 38 is shown at the point of impact with the surface 16 of the earth 18. At projectile 38 impact, a large portion of the kinetic energy is transferred to the earth 18 producing acoustic energy which propagates in the manner illustrated schematically by the broken line shock waves 32. Furthermore, when the projectile 38 impacts with the earth's surface 16, a small portion of the kinetic energy causes the compression mass 74 to move and compress the storage coil conductor 78. This compression action reduces the inductance of the storage coil conductor 78. As magnetic flux is conserved by law, the product of the inductance and the current flowing therein must be a constant. When the inductance is reduced by a factor due to the compression action at projectile 38 impact, the initially applied current (comprising the seed flux) within the storage coil conductor 78 is magnified by that same factor. This magnified current flows through the loop antenna 80 which emits wide-band electromagnetic radiation propagating in the manner illustrated schematically by the solid line waves 26. It should be noted that the electromagnetic radiation is generated before the projectile 38 (and its storage coil conductor 78) are destroyed by the impact with the surface 16 of the earth 18, with that impact simultaneously being used in generating and releasing acoustic energy.

The electromagnetic radiation impulse generated by the impact of the kinetic flux compression type projectile 38 can be shaped through the use of fuses (not shown) to reduce the rise time, and also through the use of voltage controlled switches (not shown) to terminate the pulse tail. The size of the generated electromagnetic radiation impulse may also be scaled by increasing the size of the projectile 38. Smaller sized projectiles 38 may be used to inject electromagnetic radiation for object detection, while larger sized projectiles may be used to generate electromagnetic radiation of sufficient strength to fuse electronics or disrupt communications. Large projectiles imparting a correspondingly large amount of acoustic energy may be useful in geologic surveying for mineral and carbonbased fuel deposits.

Reference is now made to FIG. 4 wherein there is shown the operation of a kinetic piezo-electric compression type projectile 38' used in another embodiment of the present invention for injecting both acoustic energy and electromagnetic radiation into the earth. At the top of FIG. 4, the kinetic piezo-electric compression type projectile 38' is shown loaded into a barrel 70 of the detection rifle 54. The kinetic piezo-electric compression type projectile 38' includes, at one end thereof, an anvil mass 72, and, at an opposite end thereof, a compression mass 74. The anvil mass 72 and compression mass 74 are separated from each other by a casing 76. The casing 76 is hollow to define an opening within which a piezo-electric crystal stack 78' is located.

To fire the kinetic piezo-electric compression type projectile 38', an appropriate explosion 82 is instigated behind the compression mass 74 and within the barrel 70 of the detection rifle 54. The explosion 82 causes the kinetic piezo-electric compression type projectile 38' to travel along, and be expelled from, the barrel 70. The casing 76, in combination with the restriction applied by the barrel 70, prevents the compression mass 74 from compressing the piezo-electric crystal stack 78' against the anvil mass 72 at the point of firing.

Turning now to the middle of FIG. 4, the kinetic piezo-electric compression type projectile 38' is shown in mid flight. At this point, the kinetic piezo-electric compression type projectile 38' has acquired a substantial amount of kinetic energy from the explosion 82. During flight, the casing 76, no longer under restriction applied by the barrel 70, may fall away from the kinetic piezo-electric compression type projectile 38'.

At the bottom of FIG. 4, the kinetic piezo-electric compression type projectile 38' is shown at the point of impact with the surface 16 of the earth 18. At projectile 38' impact, a large portion of the kinetic energy is transferred to the earth 18 producing acoustic energy which propagates in the manner illustrated schematically by the broken line shock waves 32. Furthermore, when the projectile 38' impacts with the earth's surface 16, a small portion of the kinetic energy causes the compression mass 74 to move and compress the piezo-electric crystal stack 78'. This compression action generates a large voltage across the piezo-electric crystal stack 78', with the stack itself serving as a dipole antenna which emits wide-band electromagnetic radiation propagating in the manner illustrated schematically by the solid line waves 26. Alternatively, the kinetic piezo-electric compression type projectile 38' may trail an antenna conductor 80 connected to the piezo-electric crystal stack 78' to emit the wide-band electromagnetic radiation at impact. It should be noted that the electromagnetic radiation is generated before the projectile 38' (and its piezo-electric crystal stack 78') are destroyed by the impact with the surface 16 of the earth 18, with that impact simultaneously being used in generating and releasing acoustic energy.

The size of the generated electromagnetic radiation impulse may also be scaled by increasing the size of the projectile 38'. Smaller sized projectiles 38' may be used to inject electromagnetic radiation for object detection, while larger sized projectiles may be used to generate electromagnetic radiation of sufficient strength to fuse electronics or disrupt communications. Large projectiles imparting a correspondingly large amount of acoustic energy may be useful in geologic surveying for mineral and carbon-based fuel deposits.

Figure 5:
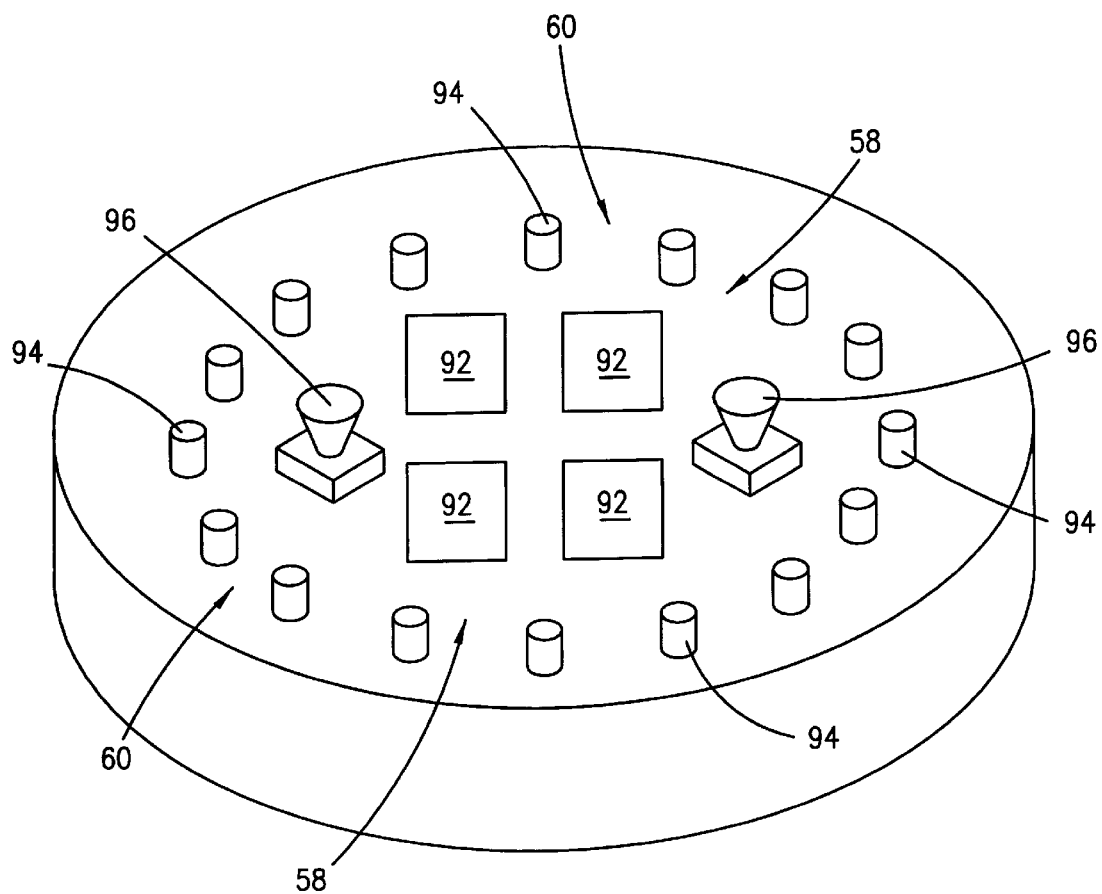
FIG. 5 is an orthogonal view of a platform supporting the electromagnetic sensor array and optical sensor array of the present invention.

Reference is now made to FIG. 5 wherein there is shown an orthogonal view of a platform 90 for supporting the electromagnetic sensor array 58 and optical sensor array 60 of the present invention. Positioned about a center of the platform 90 are the high gain, phased array antennas 92 comprising the electromagnetic sensor array 58. These antennas 92 receive and detect the wide-band electromagnetic radiation (illustrated schematically by the solid line waves 28) for subsequent post scanned array, ground penetrating RADAR-type signal processing to locate (and perhaps even discriminate) the buried objects. Positioned about a periphery of the platform 90 are the laser Doppler detectors 94 and CCD visual and/or infra-red imaging cameras 96 comprising the optical sensor array 60. The detectors 94 detect Doppler shift in laser frequency caused by ground movement for subsequent processing to locate (and perhaps even discriminate) the buried objects. The cameras 96 take a series of optical images of the shock wave propagating across the earth's surface for subsequent holographic or two-wavelength infra-red image comparison processing to locate (and perhaps even discriminate) the buried objects.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A buried object detection system, comprising:
    an airborne platform;
    an electromagnetic compression projectile;
    a mechanism for firing the electromagnetic compression projectile from the airborne platform into a surface of the earth, impact of the electromagnetic compression projectile with the earth's surface releasing acoustic energy in the form of a radially propagating surface shock wave and further releasing electromagnetic radiation in the form of a radially propagating electromagnetic wave;
    an optical sensor array mounted to the airborne platform to detect buried object affected surface movement of the earth's surface due to propagation of the surface shock wave;
    an electromagnetic sensor array mounted to the airborne platform to detect buried object reflections of the propagating electromagnetic wave; and
    means for processing signals indicative of detected surface movement and detected electromagnetic wave reflections to locate the buried object.

2. The system as in claim 1 wherein the airborne platform comprises a helicopter.

3. The system as in claim 1 wherein the airborne platform comprises an airplane.

4. The system as in claim 1 wherein the airborne platform comprises a blimp.

5. The system as in claim 1 wherein the mechanism for firing comprises a rifle.

6. The system as in claim 1 wherein the optical sensor array comprises a plurality of peripherally mounted laser Doppler detectors each operating to detect Doppler shift in laser frequency caused by shock wave induced surface movement.

7. The system as in claim 6 wherein the means for processing operates to interpret optical sensor array detected Doppler shifts in laser frequency to identify ground movement related to the buried object.

8. The system as in claim 1 wherein the optical sensor array comprises a plurality of cameras for taking a series of the optical images of the earth's surface during shock wave propagation.

9. The system as in claim 8 wherein the means for processing operates to process the series of the optical images of the earth's surface using holographic image comparison to identify ground movement related to the buried object.

10. The system as in claim 8 wherein the means for processing operates to process the series of the optical images of the earth's surface using two-wavelength infra-red image comparison to identify ground movement related to the buried object.

11. The system as in claim 1 wherein the electromagnetic sensor array comprises a phased array antenna for receiving the buried object reflected electromagnetic radiation.

12. The system as in claim 11 wherein the means for processing operates to interpret electromagnetic sensor array detected the reflected electromagnetic radiation to identify reflections indicative of the buried object.

13. The system as in claim 1 wherein the electromagnetic compression projectile comprises:
    an anvil mass releasing at impact with the earth's surface acoustic energy in the form of the radially propagating surface shock wave;
    a loop antenna;
    a storage coil conductor electrically connected to the loop antenna and having a seed magnetic flux therein; and
    a compression mass for compressing the storage coil conductor at impact with the earth's surface, magnifying the seed magnetic flux, and releasing through the loop antenna electromagnetic radiation in the form of the radially propagating electromagnetic wave.

14. The system as in claim 1 wherein the electromagnetic compression projectile comprises:
    an anvil mass releasing at impact with the earth's surface acoustic energy in the form of the radially propagating surface shock wave;
    a piezo-electric crystal stack; and
    a compression mass for compressing the piezo-electric crystal stack at impact with the earth's surface and releasing electromagnetic radiation in the form of the radially propagating electromagnetic wave.

15. The system as in claim 14 wherein the electromagnetic compression projectile further comprises an antenna trailing the projectile and electrically connected to the piezo-electric crystal stack for releasing electromagnetic radiation.

16. The system as in claim 1 further comprising:

an explosive projectile; and wherein the mechanism further operated for firing the explosive projectile from the airborne platform into the surface of the earth at the detected location of the buried object to effectuate an object neutralization.

17. A method for buried object detection, comprising the steps of:

firing an electromagnetic compression projectile from a remote location into a surface of the earth, impact of the electromagnetic compression projectile with the earth's surface releasing acoustic energy in the form of a radially propagating surface shock wave and further releasing electromagnetic radiation in the form of a radially propagating electromagnetic wave;

remotely optically sensing buried object affected surface movement of the earth's surface due to propagation of the surface shock wave;

remotely electromagnetically sensing buried object reflections of the propagating electromagnetic wave; and processing sensed surface movement and electromagnetic wave reflections to locate the buried object.

18. The method as in claim 17 further including the step of firing an explosive projectile from a remote location into the surface of the earth at the detected location of the buried object to effectuate an object neutralization.

19. The method as in claim 17 wherein the step of remotely optically sensing comprises the step of detecting Doppler shift in laser frequency caused by shock wave induced surface movement.

20. The method as in claim 19 wherein the step of processing comprises the step of interpreting detected Doppler shifts in laser frequency to identify ground movement related to the buried object.

21. The method as in claim 17 wherein the step of remotely optically sensing comprises the step of taking a series of the optical images of the earth's surface during shock wave propagation.

22. The method as in claim 21 wherein the step of processing comprises the step of processing the series of the optical images of the earth's surface using holographic image comparison to identify ground movement related to the buried object.

23. The method as in claim 21 wherein the step of processing comprises the step of processing the series of the optical images of the earth's surface using two-wavelength infra-red image comparison to identify ground movement related to the buried object.

24. The method as in claim 17 wherein the step of remotely electromagnetically sensing comprises the step of receiving the buried object reflected electromagnetic radiation.

25. The method as in claim 24 wherein the step of processing comprises the step of interpreting received reflected electromagnetic radiation to identify reflections indicative of the buried object.

* * * * *